United States Patent [19]

Hanes

[11] Patent Number: 4,491,546
[45] Date of Patent: Jan. 1, 1985

[54] PALLADIUM-LIGAND COMPLEX FOR USE IN CATALYZING THE REACTION OF A MIXTURE OF 1,3-BUTADIENE, CARBON MONOXIDE AND MONOALKANOL TO PROVIDE ALKYL NONADIENOATE ESTER

[75] Inventor: Ronnie M. Hanes, Milford, Ohio

[73] Assignee: National Distillers and Chemical Corporation, New York, N.Y.

[21] Appl. No.: 348,621

[22] Filed: Feb. 12, 1982

Related U.S. Application Data

[62] Division of Ser. No. 258,140, Apr. 27, 1981, abandoned.

[51] Int. Cl.$^3$ ............................................. C07F 15/00
[52] U.S. Cl. ................................................. 260/429 R
[58] Field of Search ..................... 260/429 R, 410.9 C

[56] References Cited

U.S. PATENT DOCUMENTS 3,641,074  2/1972  Fenton ...................... 260/410.9 C
3,780,074 12/1973  Romanelli ................ 260/410.9 C
4,124,617 11/1978  Knifton .................. 260/410.9 C X
4,172,087 10/1979  Knifton .................. 260/410.9 C X Primary Examiner—Helen M. S. Sneed
Attorney, Agent, or Firm—Kenneth D. Tremain

[57] ABSTRACT

A mixture of 1,3-butadiene, carbon monoxide and a monoalkanol of the general formula ROH in which R is a straight or branched chain alkyl group of from 1 to about 12 carbon atoms is reacted in the presence of catalyst to provide alkyl nonadienoate ester at high levels of productivity and little, if any, catalyst decomposition, employing as catalyst, a palladium-ligand complex comprising:

(a) a member selected from the group consisting of zerovalent palladium, a palladium-containing composition which provides zerovalent palladium under reaction conditions and palladium (II) salt;

(b) a strong ligand selected from the group consisting of tertiary phosphine having a pKa in water of not greater than about 6, a phosphite of the general formula $(R^1O)(R^2O)(R^3O)P$ in which each of $R^1$, $R^2$ and $R^3$ is an alkyl group having at least 9 carbon atoms, an aryl group or an alkaryl group, an arsine of the general formula $R^1R^2R^3As$ in which each of $R^1$, $R^2$ and $R^3$ have the aforestated meanings and a stibine of the general formula $R^1R^2R^3Sb$ in which each of $R^1$, $R^2$ and $R^3$ have the aforestated meanings, the mole ratio of said strong ligand to palladium being from about 1:1 to about 3:1, and, (c) a weak ligand selected from the group consisting of tertiary phosphine having a pKa in water of greater than about 6, a phosphite of the general formula $(R^4O)(R^5O)(R^6O)P$ in which each of $R^4$, $R^5$ and $R^6$ is an alkyl group having less than 9 carbon atoms, an arsine of the general formula $R^7R^8R^9As$ in which each of $R^7$, $R^8$ and $R^9$ is an alkyl group having less than 9 carbon atoms or an alkoxy group and a stibine of the general formula $R^7R^8R^9Sb$ in which each of $R^7$, $R^8$ and $R^9$ have the aforestated meanings, the mole ratio of said weak ligand to palladium being from about 4:1 to about 100:1.

8 Claims, No Drawings

PALLADIUM-LIGAND COMPLEX FOR USE IN CATALYZING THE REACTION OF A MIXTURE OF 1,3-BUTADIENE, CARBON MONOXIDE AND MONOALKANOL TO PROVIDE ALKYL NONADIENOATE ESTER

This is a divisional of application Ser. No. 258,140, filed Apr. 27, 1981, now abandoned

BACKGROUND OF THE INVENTION

This invention relates to processes for the preparation of esters and, more particularly, to the one-step preparation of alkyl nonadienoate esters by the reaction of 1,3-butadiene, carbon monoxide and alkanol in the presence of a palladium-containing catalyst.

The reaction of monoolefins and conjugated diolefins with carbon monoxide and alkanol to provide an alkyl ester is well known. Numerous catalysts have been used or proposed for this synthesis including bis(triphenylphosphine) palladium chloride as in U.S. Pat. No. 3,437,676; a palladium complex such as palladium diacetate with an aromatic phosphine such as triphenylphosphine as in U.S. Pat. No. 3,530,155, Japanese Pat. No. 72/37,934, Tsuji, et al., *Tetrahedron* 28, 3721 (1972) and Billups, et al., *J.C.S. Chem. Comm.*, 18 (5), 1067 (1971); palladous chloride, cupric chloride and triphenylphosphine as in U.S. Pat. No. 3,530,168; palladium halide in molten tetrahydrocarbylammonium or phosphonium trihalostannate (II) or trihalogermanate (II) salts as in U.S. Pat. Nos. 3,657,368, 3,832,391, 3,968,133, 4,038,208 and 4,042,530; palladium salt complexed with a phosphine ligand such as palladium dichloride bis(triphenylphosphine) in the presence of a tin cocatalyst or promoter such as stannous chloride dihydrate as in U.S. Pat. No. 3,700,706; the palladium complex [PdCl$_2$(triphenylphosphine)$_2$](C$_6$H$_4$Cl$_2$)$_x$ as in U.S. Pat. No. 3,723,486; compounds of the formula (L)$_2$ MXY wherein L is a phosphinite, phosphonite, thiophosphinite, or dithiophosphonite ligand, M is palladium and X and Y are chloride, bromide, iodide, various substituted and unsubstituted alkyls and aryls, cyano, SnCl$_3$, isocyanate, thiocyanate, aroyl and lower perfluoroalkyl groups as in U.S. Pat. Nos. 3,776,929 and 3,906,615; zerovalent palladium phosphine complex with or without added catalyst activator (additional phosphine) as in U.S. Pat. No. 3,780,074 and, ligand-stabilized platinum (II) catalyst complexed with excess Group IV-B metal halide, the ligand being selected from Groups V-B and VI-B of the Periodic Table as in U.S. Pat. No. 3,819,669. U.S. Pat. Nos. 4,124,617 and 4,172,087 each describes a one-step reaction of a conjugated aliphatic diene, alkanol and carbon monoxide in a nitrogen-containing tertiary base and in the presence of a palladium salt/tertiary phosphorus-containing donor ligand as catalyst to provide an unsaturated aliphatic ester derivative thereof. Other catalyst compositions which have been disclosed for use in the aforedescribed synthesis include a combination of palladium chloride/triphenylphosphine complex and additional triphenylphosphine as in Japanese Pat. No. 73/25,169; and, palladium diacetate and amino-substituted phosphine as in Japanese Patent No. 76/149,206.

SUMMARY OF THE INVENTION

It has now been surprisingly discovered that a mixture of 1,3-butadiene, carbon monoxide and a monoalkanol of the general formula ROH in which R is a straight or branched chain alkyl group of from 1 to about 12 carbon atoms can be reacted in the presence of catalyst to provide alkyl nonadienoate ester at high levels of productivity and little, if any, catalyst decomposition, employing as catalyst, a palladium-ligand complex comprising:

(a) a member selected from the group consisting of zerovalent palladium, a palladium-containing composition which can provide zerovalent palladium under reaction conditions and palladium (II) salt;

(b) a strong ligand selected from the group consisting of tertiary phosphine having a pKa in water of not greater than about 6, a phosphite of the general formula (R$^1$OXR$^2$OXR$^3$O)P in which each of R$^1$, R$^2$ and R$^3$ is an alkyl group having at least 9 carbon atoms, an aryl group or an alkaryl group, an arsine of the general formula R$^1$R$^2$R$^3$As in which each of R$^1$, R$^2$ and R$^3$ have the aforestated meanings and a stibine of the general formula R$^1$R$^2$R$^3$Sb in which each of R$^1$, R$^2$ and R$^3$ have the aforestated meanings, the mole ratio of said strong ligand to palladium being from about 1:1 to about 3:1; and, (c) a weak ligand selected from the group consisting of tertiary phosphine having a pKa in water of greater than about 6, a phosphite of the general formula (R$^4$O) (R$^5$O) (R$^6$O)P in which each of R$^4$, R$^5$ and R$^6$ is an alkly group having less than 9 carbon atoms, an arsine of the general formula R$^7$R$^8$R$^9$As in which each of R$^7$, R$^8$ and R$^9$ is an alkyl group having less than 9 carbon atoms or an alkoxy group and a stibine of the general formula R$^7$R$^8$R$^9$Sb in which each of R$^7$, R$^8$ and R$^9$ have the aforestated meanings, the mole ratio of said weak ligand to palladium being from about 4:1 to about 100:1.

The palladium-donor ligand complex of this invention can provide significantly higher levels of productivity compared to those of known and conventional catalyst systems employed in the telomerization/carbonylation of 1,3-butadiene to provide alkyl nonadienoate and unlike the significant catalyst decomposition observed to have occured in known catalyst compositions, no appreciable amount of catalyst decomposition has been detected in the catalyst compositions of this invention.

The alkyl nonadienoate ester produced by the process of this invention can be readily reduced by known and conventional techniques, e.g., catalytic hydrogenation, to the corresponding alkyl nonanoate esters which are useful in the formulation of synthetic lubricants.

DESCRIPTION OF THE PREFERRED EMBODIMENTS

The 1,3-butadiene employed in the present invention can vary in its degree of purity with industrial grades of this diolefin being preferred for reasons of economy and ready availability.

Alkanols which are suitably co-reacted with butadiene include methanol, ethanol, propanol, isopropanol, n-butanol, sec-butanol, tert-butanol, hexanol, decanol, dodecanol, and the like.

As stated above, the palladium component of the catalyst complex herein can be zero-valent palladium, a palladium-containing composition which will provide zerovalent palladium, i.e., will undergo reduction, under the conditions of the reaction and/or a palladium (II) salt, with or without the additional presence of a reducing agent such as alkali metal alkoxide, alkali metal acetate and/or alkali metal borohydride. Among such palladium-containing compositions are included palladium (II) acetate, palladium (II) formate, palladium (II) octanoate, palladium (II) propionate, palladium acetylacetonate, palladium (II) bis (π-allyl), palladium (II) nitrate, palladium sulfate, and palladium (II) halides such as palladium chloride and palladium bromide. Molar ratios of palladium to 1,3-butadiene which can be used herein can vary widely, e.g., from about 1:25 to about 1:20,000, with from about 1:2,000 to about 1:8,000 being preferred.

Examples of strong ligands which are useful herein, together with the productivities and the palladium precipitate rating (a measure of catalyst decomposition) of each, are given below in Table 1 as follows:

TABLE I

| Strong Ligand (Ligand:Pd = 1:1) | Catalyst Productivity (moles ester/mole Pd/hr) | Pd Precipitate Rating[a] |
| --- | --- | --- |
| $P(CH_2CH_2CN)_3$[b] | 108 | 0 |
| $PPh(CH_2CH_2CN)_2$[c] | 52 | 2 |
| $PPh_3$[c] | 12 | 1 |
| $P(Odecyl)(OPh)_2$[b] | 49 | 2 |
| 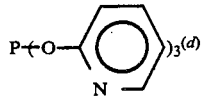 | 139 | 4 |
| 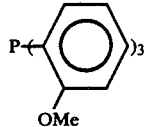 | 138 | 7 |
| 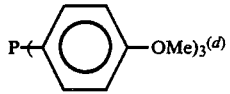 | 344 | 7 |
| $Ph_2As-CH_2CH_2-AsPh_2$[b] | 52 | 6 |
| $P(CH_2Ph)_3$[c] | 14.5 | 4 |
| $AsPh_3$[e] | 275 | 7 |

[a] On a subjective rating scale of 0 to 10, 0 indicates no appreciable palladium decomposition and 10 indicates gross decomposition.
[b] Catalyst preparation cycle: 8 hrs., 90° C., 500 psig CO, 10:1 $PBu_3$ as weak ligand. Reaction: 4 hrs., 110° C., 1,000 psig CO.
[c] 95° C., 1,000 psig CO, 10 hrs. reaction, 10:1 $PBu_3$ as weak ligand.
[d] 100° C., 500 psig CO, 10:1 $PBu_3$, 2:1 sodium methoxide as promoter.
[e] 110° C., 500 psig CO, 10:1 $PBu_3$.

Examples of useful weak ligands, together with the effect on conversion of methanol and their palladium precipitate ratings, are given below in Table II as follows:

TABLE II

| Weak Ligand (Ratio) | Methanol Conversion (%) | Pd Precipitate Rating (a) |
| --- | --- | --- |
| $PBu_3(10)$[b] | 30 | 3 |
| $PPhBu_2(10)$[b] | 31 | 3 |
| $PPh(cyclohexyl)_2(10)$[b] | 30 | 1 |
| $P(OiPr)_3(5)$[c] | 28 | 3 |

[a] 110° C., 1,000 psig CO, 10 hours.
[b] 1:1 $P(CH_2CH_2CN)_3$ as strong ligand.
[c] 1:1 $P(OPh)_2(OC_{10}H_{23})$ as strong ligand.

From the above, it can be seen that one of the most effective combinations of strong and weak ligands is that of tris(2-cyanoethyl)phosphine which has a pKa in water of 1.37 and tri-n-butyl phosphine which has a pKa in water of 8.43. Other strong and weak phosphine ligands are given in O.A. Streuli, *Analytical Chemistry*, 32 (8), p. 985 (July 1960), the contents of which are incorporated by reference herein.

It is also within the scope of the present invention to incorporate alkoxide ion in the reaction medium to further improve the stability of the palladium catalyst, either preformed or formed in situ by merely dissolving alkali metal or other source of chemically reactive alkali metal, e.g., alkali metal borohydride, in the selected alkanol, ROH. Alkoxide ion is formed quantitatively according to the reaction (illustrated for sodium metal which is preferred):

$$ROH + NA \rightarrow RO^- + Na^{30} + \tfrac{1}{2}H_2$$

The alkanol chosen for conversion to the corresponding alkoxide can be any alkanol heretofore described as a reactant and advantageously is identical with said reactant. In such case, the alkoxide ion is preferably generated in situ by the addition of an amount of alkali metal calculated to provide the desired amount of ion. The amount of alkoxide ion which can be used herein can vary over fairly wide limits. Thus, for example, from about 0.1 to about 10 molar equivalents of alkoxide ion per gram atoms, of palladium, and preferably, from about 0.5 to about 5 molar equivalents of alkoxide ion per gram atom of palladium, can be used with good results.

The reaction herein requires at least a stoichiometric quantity of carbon monoxide which can be supplied as a relatively pure gas or in admixture with up to 30 volume percent of an inert gas such as nitrogen, argon, neon, and the like.

Optimum choice of reaction conditions will depend in part upon the nature and concentration of the reactants, the catalyst and the optional alkoxide. Temperatures of from about 30° to about 150°, pressures on the order of from about 100 psig to about 3,000 psig and reaction times of up to 20 hours are suitable. In one procedure which can be used to obtain the catalyst herein, all reaction ingredients with the exception of the 1,3-butadiene, i.e., palladium-containing component, strong ligand, weak ligand and alkanol, are added to a reactor, the reactor is purged and pressurized to 500 psig carbon monoxide pressure and heated to 90° C. for 1 to 8 hours. Thereafter, the reactor is cooled to ambient temperature, vented and 1,3-butadiene added with the reaction being conducted as described above and as illustrated in the following examples.

EXAMPLE 1

This example is illustrative of a process for preparing methyl nonadienoate carried out in accordance with the disclosure of U.S. Pat. Nos. 4,124,617 or 4,172,087.

To a 300 cc stirred autoclave was added 80 ml quinoline, 40 ml methanol, 2.67 mmoles $Pd(OAc)_2$, and 5.5 mmoles $PBu_3$. Butadiene (354 mmoles) was then charged to the reactor and the reactor pressurized to 700 psig with CO. The reactor was then heated at 110° C. for 6 hours. Analysis of the product solution by gas-liquid chromatography showed 173 mmoles ester present. The palladium precipitate rating was 10.

EXAMPLE 2

Contrasting with the results of Example 1 was the high productivity and the low palladium precipitate rating obtained in accordance with the process of the present invention as illustrated in this example.

To a 300 cc stirred autoclave was added 0.15 mmole Pd(OAc)$_2$, 0.15 mmole tris(2-cyanoethyl)phosphine, 1.5 mmole tributylphosphine and 59 ml methanol. The autoclave was pressurized to 500 psig with CO and heated at 90° C. for 8 hours. After cooling, the autoclave was vented and 462 mmoles 1,3-butadiene added. The autoclave was pressurized to 1000 psig with CO and heated at 110° C. for 4 hours. Analysis of the product solution showed 64.7 mmoles of ester. The palladium precipitate rating was 0.

EXAMPLE 3

To a 300 cc Magnedrive autoclave was added 0.033 g (0.15 mmole) Pd(OAc)$_2$, 0.087 g (0.45 mmole)tris(2-cyanoethyl)-phosphine, 0.910 g (4.5 mmoles) tri-n-butylphosphine, 46 ml methanol and 5 ml anisole (as internal standard). The reactor was purged three times with CO, pressurized to 500 psig with CO and heated at 90° C. for 2 hours. After cooling to room temperature the reactor was vented. To the reactor was added 63 g (1170 mmoles) of butadiene and the reactor heated at 110° C. under a constant 500 psig CO atmosphere for 4 hours. A trace of palladium decomposition was observed and wax formation was moderate. Analysis of the product solution by CLC showed 9 mmoles octatriene, 27 mmoles methoxyoctadiene and 10 mmoles methyl nonadienoate.

EXAMPLE 4

This example demonstrates the advantage of the use of the alkoxide sodium methoxide over the previous example.

To a 300 cc Magnedrive autoclave was added 0.910 g (4.5 mmoles) tri-n-butylphosphine, 0.033 g (0.15 mmole) palladium acetate, 0.087 g (0.45 mmole)tris(2-cyanoethyl)-phosphine, 0.54 g (10 mmoles) sodium methoxide, 46 ml methanol and 5 ml anisole (internal standard). The reactor was purged three times with CO, pressurized to 500 psig with CO and heated at 90° C. for 2 hours. After cooling to room temperature, the reactor was vented. To the reactor was added 62.8 g (1160 mmoles) butadiene and the reactor was heated at 110° C. under a constant 500 psig CO atmosphere for 4 hours. No palladium decomposition was observed and wax formation was moderate. Analysis of the product solution by GLC showed 6 mmoles octatriene, 13 mmoles methoxyoctadiene and 35 mmoles methyl nonadienoate.

EXAMPLE 5

This example demonstrates the use of a zero-valent palladium complex as a catalyst.

A methanolic solution of zerovalent palladium complex was prepared by reduction of palladium chloride (0.5334 g) in the presence of a four-fold excess of tributyl phosphine (2.6186) using hydrazine as a reducing agent. To a portion of this methanolic solution was added a stoichiometric amount of diphenyl decyl phosphite (0.2230 g).

An aliquot of this solution containing 0.1805 mmoles Pd was charged to a 71 cc glass-lined Parr bomb along with 7 ml methanol and 5 g butadiene. The bomb was filled to 1000 psig with CO and heated at 95° C. for 10 hours. A trace of palladium decomposition was observed after reaction. Analysis of the product solution showed the presence of 4.55 mmoles methyl nonadienoate or 25.5 moles ester/mole palladium.

EXAMPLE 6

This example demonstrates the use of a zerovalent palladium catalyst.

To a 71 cc glass-lined Parr bomb was added 0.0995 g 5% Pd on carbon, 0.0168 g triphenyl phosphite, 0.0954 g tributyl phosphine, 10 ml methanol and 9 g butadiene. The bomb was filled to 1,000 psig with CO and heated at 90° C. for 12 hours. The product solution was bright yellow indicating a soluble palladium complex. Analysis of the product solution showed the presence of 4.8 mmoles methyl nonadienoate or 100 moles methyl nonadienoate/mole Pd.

EXAMPLE 7

To a 300 cc glass-lined stirred autoclave were charged 0.0155 g (0.069 mmoles) Pd(OAc)$_2$, 0.0321 g (0.083 mmoles) P(OPh)$_2$(O-decyl), 0.1062 g (0.526 mmoles) PBu$_3$ and 30 ml methanol. The autoclave was sealed and 30 g butadiene were added with a syringe. The reactor was then heated at 90° C. under a constant CO pressure of 500 psig for 12 hours. Stirrer speed was maintained at 1,500 rpm. The recovered product solution (38 ml) was bright yellow and contained 23 mmoles of methyl nonadienoate. Selectivity to the ester was 97% and butadiene conversion was 8%. No catalyst decomposition was observed.

EXAMPLE 8

To a 71 cc glass-lined Parr Autoclave were charged 0.014 g (0.062 mmoles) Pd(OAc)$_2$, 0.0152 g (0.079 mmoles) tris(2-cyanoethyl)phosphine, 0.1562 g (0.773 mmoles) PBu$_3$, 10 ml methanol and 9 g butadiene. The autoclave was then pressurized to 1,000 psig with CO and shaken at 90° C. for 12 hours. The recovered product solution (12.5 ml) was bright yellow and contained 19 mmoles of methyl nonadienoate. Selectivity to the ester was 89% and butadiene conversion was 22%. No catalyst decomposition was observed.

What is claimed is:

1. A palladium-ligand complex for use in catalyzing the reaction of a mixture of 1,3-butadiene, carbon monoxide and a monoalkanol of the general formula ROH in which R is a straight or branched chain alkyl group of from 1 to about 12 carbon atoms to provide alkyl nonadienoate, said complex being obtained by the process which comprises contacting under complex-forming conditions.

(a) a member selected from the group consisting of zerovalent palladium, a palladium-containing composition which provides zerovalent palladium under reaction conditions and palladium (II) salt;

(b) a strong ligand selected from the group consisting of tertiary phosphine having a pKa in water of not greater than about 6, a phosphate of the general formula (R$^1$O) (R$^2$O) (R$^3$O)P in which each of R$^1$, R$^2$ and R$^3$ is an alkyl group having at least 9 carbon atoms, an aryl group or an alkaryl group, an arsine of the general formula R$^1$R$^2$R$^3$As in which each of R$^1$, R$^2$ and R$^3$ have the aforestated meanings and a stibine of the general formula R$^1$R$^2$R$^3$Sb in which each of R$^1$, R$^2$ and R$^3$ have the aforestated meanings, the mole ratio of said strong ligand to palladium being from about 1:1 to about 3:1; and, (c) a weak ligand selected from the group consisting of tertiary phosphine having a pKa in water of greater than about 6, a phosphite of the general formula (R$^4$O) (R$^5$O) (R$^6$O)P in which each of R$^4$, $R^5$ and $R^6$ is an alkyl group having less than 9 carbon atoms, an arsine of the general formula $R^7R^8R^9As$ in which each of $R^7$, $R^8$ and $R^9$ is an alkyl group having less than 9 carbon atoms or an alkoxy group and a stibine of the general formula $R^7R^8R^9Sb$ in which each of $R^7$, $R^8$ and $R^9$ have the aforestated meanings, the mole ratio of said weak ligand to palladium being from about 4:1 to about 100:1 thereby providing said palladium-ligand complex.

2. The palladium-ligand complex of claim 1 wherein the strong ligand is at least one member selected from the group consisting of: $P(CH_2CH_2CN)_3$, $PPh(CH_2CH_2CN)_2$; $PPh_3$, $P(Odecyl)(OPh)_2$,

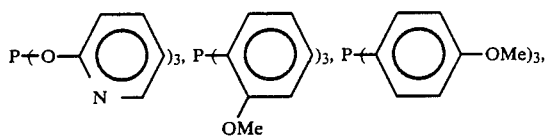

$Ph_2As-CH_2CH_2-AsPh_2$, $P(CH_2Ph)_3$ and $AsPh_3$.

3. The palladium-ligand complex of claim 1 wherein the weak ligand is at least one member selected from the group consisting of $PBu_3$, $PPhBu_2$, $PPh(cyclohexyl)_2$ and $P(OiPr)_3$.

4. A palladium-ligand complex for use in catalyzing the reaction of a mixture of 1,3-butadiene, carbon monoxide and monoalkanol of the general formula ROH in which R is a straight or branched chain alkyl group of from 1 to about 12 carbon atoms to provide alkyl nonadienoate, said complex being obtained by the process which comprises contacting under complex-forming conditions:
(a) a member selected from the group consisting of zerovalent palladium, a palladium-containing composition which provides zerovalent palladium under reaction conditions and palladium (II) salt;
(b) a strong ligand selected from the group consisting of: $P(CH_2CH_2CN)_3$, $PPh(CH_2CH_2CN)_2$; $PPh_3$, $P(Odecyl)(OPh)_2$,

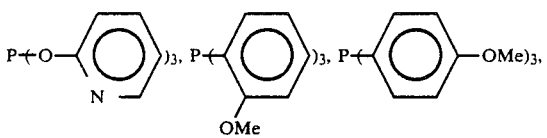

$Ph_2As-CH_2CH_2-AsPh_2$, $P(CH_2Ph)_3$ and $AsPh_3$; and,
(c) a weak, ligand, said weak ligand being $pBu_3$. thereby providing said palladium-ligand complex.

5. A process for preparing a palladium-ligand complex for use in catalyzing the reaction of a mixture of 1,3-butadiene, carbon monoxide and a monoalkanol of the general formula ROH in which R is a straight or branched chain alkyl group of from 1 to about 12 carbon atoms to provide alkyl nonadienoate which comprises contacting under complex-forming conditions in the presence of carbon monoxide and in the absence of 1,3-butadiene:
(a) a member selected from the group consisting of zerovalent palladium, a palladium-containing composition which provides zerovalent palladium under reaction conditions and palladium (II) salt;
(b) a strong ligand selected from the group consisting of tertiary phosphine having a pKa in water of not greater than about 6, a phosphate of the general formula $(R^1O)(R^2O)(R^3O)P$ in which each of $R^1$, $R^2$ and $R^3$ is an alkyl group having at least 9 carbon atoms, an aryl group or an alkaryl group, an arsine of the general formula $R^1R^2R^3As$ in which each of $R^1$, $R^2$ and $R^3$ have the aforestated meanings and a stibine of the general formula $R^1R^2R^3Sb$ in which each of $R^1$, $R^2$ and $R^3$ have the aforestated meanings, the mole ratio of said strong ligand to palladium being from about 1:1 to about 3:1; and,
(c) a weak ligand selected from the group consisting of tertiary phosphine having a pKa in water of greater than about 6, a phosphite of the general formula $(R^4O)(R^5O)(R^6O)P$ in which each of $R^4$, $R^5$ and $R^6$ is an alkyl group having less than 9 carbon atoms, an arsine of the general formula $R^7R^8R^9As$ in which each of $R^7$, $R^8$ and $R^9$ is an alkyl group having less than 9 carbon atoms or an alkoxy group and a stibine of the general formula $R^7R^8R^9Sb$ in which each of $R^7$, $R^8$ and $R^9$ have the aforestated meanings, the mole ratio of said weak ligand to palladium being from about 4:1 to about 100:1 palladium-ligand complex being combined with a catalyst thereby providing said palladium-ligand complex.

6. The process of claim 5 wherein the strong ligand is at least one member selected from the group consisting of: $P(CH_2CH_2CN)_3$, $PPh(CH_2CH_2CN)_2$; $PPh_3$, $P(Odecyl)(OPh)_2$,

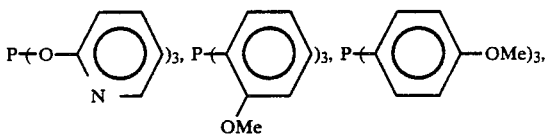

$Ph_2As-CH_2CH_2-AsPh_2$, $P(CH_2Ph)_3$ and $AsPh_3$.

7. The process of claim 5 wherein the weak ligand is at least one member selected from the group consisting of $PBu_3$, $PPhBu_2$, $PPh(cyclohexyl)_2$ and $P(OiPr)_3$.

8. A process for preparing a palladium ligand complex for use in catalyzing the reaction of a mixture of 1,3-butadiene, carbon monoxide and monoalkanol of the general formula ROH in which R is a straight or branched chain alkyl group of from 1 to about 12 carbon atoms to provide alkyl nonadienoate which comprises contacting under complex-forming conditions:
(a) a member selected from the group consisting of zerovalent palladium, a palladium-containing composition which provides zerovalent palladium under reaction conditions and palladium (II) salt;
(b) a strong ligand selected from the group consisting of: $P(CH_2CH_2CN)_3$, $PPh(CH_2CH_2CN)_2$; $PPh_3$, $P(Odecyl)(OPh)_2$,

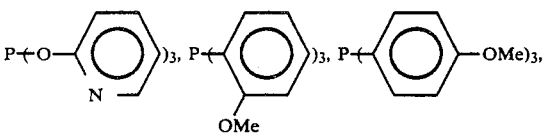

$Ph_2As-CH_2CH_2-AsPh_2$, $P(CH_2Ph)_3$ and $AsPh_3$; and,
(c) a weak ligand, said weak ligand being $PBu_3$ thereby providing said palladium-ligand complex.

* * * * *